United States Patent
Tayanagi et al.

(10) Patent No.: US 7,557,178 B2
(45) Date of Patent: Jul. 7, 2009

(54) PROCESS FOR PRODUCING ELECTROLYTE MATERIAL FOR POLYMER ELECTROLYTE FUEL CELLS, AND MEMBRANE-ELECTRODE ASSEMBLY FOR POLYMER ELECTROLYTE FUEL CELLS

(75) Inventors: Jun-ichi Tayanagi, Yokohama (JP); Atsushi Watakabe, Yokohama (JP); Susumu Saito, Yokohama (JP); Katsuya Ueno, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 580 days.

(21) Appl. No.: 11/183,748

(22) Filed: Jul. 19, 2005

(65) Prior Publication Data

US 2006/0287497 A1 Dec. 21, 2006

Related U.S. Application Data

(63) Continuation of application No. PCT/JP2004/000404, filed on Jan. 20, 2004.

(30) Foreign Application Priority Data

Jan. 20, 2003 (JP) ............................. 2003-011097

(51) Int. Cl.
    *C08J 5/20* (2006.01)
(52) U.S. Cl. .......................... 528/391; 528/401; 521/25
(58) Field of Classification Search .................. 528/391, 528/401; 521/25
    See application file for complete search history.

(56) References Cited

U.S. PATENT DOCUMENTS

| 5,399,184 | A | 3/1995 | Harada |
| 6,492,295 | B2 * | 12/2002 | Hitomi et al. ................ 502/159 |
| 6,610,789 | B2 | 8/2003 | Watakabe et al. |
| 6,685,806 | B1 | 2/2004 | Cadaval Fernandez De Leceta et al. |
| 6,960,381 | B2 * | 11/2005 | Matsukura et al. ............. 428/45 |
| 2002/0142207 | A1 | 10/2002 | Watakabe et al. |
| 2003/0198854 | A1 | 10/2003 | Watakabe et al. |
| 2004/0230018 | A1 | 11/2004 | Okazoe et al. |
| 2005/0037265 | A1 | 2/2005 | Watakabe et al. |

FOREIGN PATENT DOCUMENTS

| EP | 1 091 435 A | | 4/2001 |
| EP | 1 126 537 A1 | | 8/2001 |
| EP | 1126537 A1 | * | 8/2001 |
| EP | 1 220 344 A2 | | 7/2002 |
| EP | 1220344 A2 | * | 7/2002 |
| JP | 5-36418 | | 2/1993 |
| JP | 5-251086 | | 9/1993 |
| JP | 7-134993 | | 5/1995 |
| JP | 7-192738 | | 7/1995 |
| JP | 7-211324 | | 8/1995 |
| JP | 2001-357858 | * | 12/2001 |
| JP | 2002-216804 | * | 8/2002 |
| JP | 2002-231268 | * | 8/2002 |
| JP | 2002-260705 | * | 9/2002 |
| JP | 2002 348389 A | | 12/2002 |
| JP | 2003-321558 | * | 11/2003 |

OTHER PUBLICATIONS

U.S. Appl. No. 11/244,002, filed Oct. 6 2005, Watakabe et al.
U.S. Appl. No. 11/183,748, filed Jul. 19, 2005, Tayanagi et al.
U.S. Appl. No. 11/271,915, filed Nov. 14, 2005, Kasahara et al.
U.S. Appl. No. 11/311,560, filed Dec. 20, 2005, Watakabe et al.

* cited by examiner

*Primary Examiner*—Peter D. Mulcahy
*Assistant Examiner*—Henry Hu
(74) *Attorney, Agent, or Firm*—Oblon, Spivak, McClelland, Maier & Neustadt, P.C.

(57) ABSTRACT

A membrane-electrode assembly for polymer electrolyte fuel cells which is excellent in water repellency and gas diffusivity and which exhibits a high output power density, can be obtained by using, as an electrolyte material for polymer electrolyte fuel cells, a fluoropolymer obtained by contacting a fluoropolymer which is excellent in gas diffusivity and which has alicyclic structures in its main chain and further has sulfonic acid groups, with fluorine gas for fluorination to increase water repellency and stabilize the molecule ends. The above fluoropolymer is preferably made of a copolymer comprising repeating units based on the following monomer A and repeating units based on the following monomer B (wherein Y is a fluorine atom or a trifluoromethyl group, m is an integer of from 0 to 3, p is 0 or 1, and n is an integer of from 1 to 12):

Monomer A: A perfluoromonomer which gives a polymer having repeating units containing cyclic structures in its main chain by radical polymerization Monomer B: $CF_2=CF-(OCF_2CFY)_m-O_p-(CF_2)_n-SO_3H$.

8 Claims, No Drawings

PROCESS FOR PRODUCING ELECTROLYTE MATERIAL FOR POLYMER ELECTROLYTE FUEL CELLS, AND MEMBRANE-ELECTRODE ASSEMBLY FOR POLYMER ELECTROLYTE FUEL CELLS

TECHNICAL FIELD

The present invention relates to a membrane-electrode assembly for polymer electrolyte fuel cells and a polymer electrolyte material therefor.

BACKGROUND ART

Attention has been drawn to a hydrogen-oxygen fuel cell as a power generating system which presents substantially no adverse effects on the global environment because in principle, its reaction product is water only. Polymer electrolyte fuel cells were once mounted on spaceships in the Gemini project and the Biosatellite project, but their power densities at the time were low. Later, more efficient alkaline fuel cells were developed and have dominated the fuel cell applications in space including space shuttles in current use.

Meanwhile, with the recent technological progress, attention has been drawn to polymer fuel cells again for the following two reasons: (1) Highly ion-conductive membranes have been developed as polymer electrolytes and (2) it has been made possible to impart extremely high activity to the catalysts for use in gas diffusion electrodes by the use of carbon as the support and an ion exchange resin coating.

Accordingly, extensive studies have been conducted on a process for producing an electrode/polymer electrolyte membrane assembly (hereinafter referred to simply as an assembly) for polymer electrolyte fuel cells.

The polymer electrolyte fuel cell which is presently being studied, has a low operation temperature of from 50 to 120° C., and therefore is defective in that exhaust heat can hardly be utilized effectively for e.g. an auxiliary power for electrolyte fuel cells. For the purpose of compensating such a defect, polymer electrolyte fuel cells are required to have a particularly high output power density. Further, as an object for the practical use, it is required to develop an assembly which can give a high energy efficiency and a high output power density even under an operational condition of high utilization of fuel and air.

Under such operational conditions of a low operation temperature and high utilization of gas, especially in a cathode where water is formed by the cell reaction, clogging of an electrode porous body due to condensation of water vapor (flooding) is likely to occur. Accordingly, in order to obtain long-term stable properties, it is necessary to secure water repellency of the electrode so as not to cause flooding. This is particularly important for a polymer electrolyte fuel cell which gives a high output power density at a low temperature.

In order to secure the water repellency of the electrode, it is effective to reduce the ion exchange capacity of an ion exchange resin which coats a catalyst in the electrode, namely, to use an ion exchange resin with a low content of ion exchange groups. However, in such a case, the water content of the ion exchange resin tends to be low, whereby the electroconductivity decreases, and the cell performance decreases. Further, the gas permeability of the ion exchange resin decreases, whereby the supply of the gas to be supplied to the catalyst surface via the ion exchange resin coating will be slow. Therefore, the gas concentration in the reaction site decreases and voltage loss increases. Namely, the concentration overvoltage increases, and the output power decreases.

Accordingly, it has been attempted to use a resin having a high ion exchange capacity as an ion exchange resin which coats a catalyst, and in addition, to incorporate a fluororesin, such as a polytetrafluoroethylene (hereinafter referred to as PTFE), a tetrafluoroethylene (hereinafter referred to as TFE)/hexafluoropropylene copolymer or a TFE/perfluoro(alkyl vinyl ether) copolymer, or the like, as a water repellent agent, in the electrode, especially in the cathode, thereby to suppress flooding (see, for example JP-A-5-36418). In this specification, "an A/B copolymer" means a copolymer comprising repeating units based on A and repeating units based on B.

However, if the amount of the above water repellent agent in the electrode is increased so as to have sufficient water repellency, the electrical resistance of the electrode increases, because the above water repellent agent is an insulator. Further, there is a problem that the gas permeability decreases due to an increase of the thickness of the electrode, and the output power rather decreases. In order to compensate the decrease of electroconductivity of the electrode, it is necessary to increase the electroconductivity of e.g. a carbon material as a carrier for the catalyst or the ionic conductivity of the ion exchange resin which coats the catalyst. However, it is difficult to obtain an electrode which satisfies both sufficient electroconductivity and sufficient water repellency, and thus, it was not easy to obtain a polymer electrolyte fuel cell with a high output power and long-term stability.

Further, a method of mixing fluorinated pitch (see, for example, JP-A-7-211324) and a method of treating a catalyst carrier by fluorination (see, for example, JP-A-7-192738) have been also proposed, but there is a problem that the surface of the catalyst can not uniformly be coated with an ion exchange resin. Still further, a method of letting the water repellency have a gradient in the thickness direction of the electrode (see, for example, JP-A-5-251086 and JP-A-7-134993) has been proposed, but the production process tends to be cumbersome.

In order to increase the output power of the fuel cell, it is necessary that the ion exchange resin in the electrode has high gas permeability and high electroconductivity, and such an ion exchange resin preferably has a high concentration of exchange groups and a high water content. However, if such an ion exchange resin having a high concentration of exchange groups is used, flooding tends to occur, and the output power tends to decrease during long-term use though the initial output power becomes high by virtue of the high permeability of the fuel gas and electroconductivity.

In order to solve such problems, the present inventors proposed a perfluoropolymer having alicyclic structures in its main chain (JP-A-2002-260705). Although improvement was made as compared with a linear perfluoropolymer having sulfonic acid groups usually used for a polymer electrolyte fuel cell, such a perfluoropolymer having alicyclic structures in its main chain was not sufficient for durability or the like if it was exposed to more severe conditions.

DISCLOSURE OF THE INVENTION

Accordingly, it is an object of the present invention to provide a polymer electrolyte fuel cell which can maintain a high output power for a long term, as it has a cathode having high electroconductivity, containing an ion exchange resin with high gas permeability and having high water repellency which can be maintained even in a long term use.

The present invention provides a process for producing an electrolyte material for polymer electrolyte fuel cells which is made of a fluoropolymer having alicyclic structures in its main chain and further having sulfonic acid groups, which comprises a step of obtaining a fluoropolymer having alicyclic structures in its main chain and further having —SO$_2$F groups by radical polymerization and then contacting the fluoropolymer with fluorine gas and a step of converting the —SO$_2$F groups to sulfonic acid groups; and a process for producing a liquid composition, which comprises dissolving or dispersing the electrolyte material obtained by the above process in a —OH group-containing organic solvent.

Further, the present invention provides a process for producing a membrane-electrode assembly for polymer electrolyte fuel cells which comprises a membrane-form polymer electrolyte which is made of a fluoropolymer having alicyclic structures in its main chain and further having sulfonic acid groups, a cathode disposed on one side of the electrolyte and an anode disposed on the other side of the electrolyte, wherein the membrane-electrode assembly is produced via a step of obtaining a fluoropolymer having alicyclic structures in its main chain and further having —SO$_2$F groups by radical polymerization and then contacting the fluoropolymer with fluorine gas, a step of converting the —SO$_2$F groups to sulfonic acid groups, and a step of forming the above fluoropolymer into a membrane-form.

Furthermore, the present invention provides process for producing a membrane-electrode assembly for polymer electrolyte fuel cells which comprises a membrane-form polymer electrolyte which is made of a fluoropolymer having alicyclic structures in its main chain and further having sulfonic acid groups, a cathode disposed on one side of the electrolyte and an anode disposed on the other side of the electrolyte, wherein the membrane-electrode assembly is produced via a step of obtaining a fluoropolymer having alicyclic structures in its main chain and further having —SO$_2$F groups by radical polymerization and then contacting the fluoropolymer with fluorine gas, a step of converting the —SO$_2$F groups to sulfonic acid groups, and a step of forming the above fluoropolymer into a membrane-form.

BEST MODE FOR CARRYING OUT THE INVENTION

The electrolyte material for polymer electrolyte fuel cells to be obtained by the present invention is a fluoropolymer having alicyclic structures in its main chain and further having sulfonic acid groups, and is one highly fluorinated by contacting it with fluorine gas (hereinafter referred to as the present polymer). The present polymer is a polymer excellent in oxygen gas permeability and oxygen gas solubility, and its water discharging property is improved as fluorinated with fluorine gas.

The present inventors considered that since a linear perfluoropolymer having sulfonic acid groups which has been commonly used for fuel cells, has unstable functional groups such as —COOH groups, —CF=CF$_2$ groups, —COF groups and CF$_2$H groups at same molecular chain terminals, such a polymer gradually decomposes during long-term operation when used for an electrolyte material for polymer electrolyte fuel cells, whereby the power generation voltage decreases and the membrane strength decreases to locally cause pinholes, breaking, abrasion or the like, and they have found that the durability can be greatly improved by fluorinating (contacting with fluorine gas) such a polymer so as to stabilize the molecule terminals by perfluorination. However, in a case where the polymer was exposed to severe operation conditions, such durability was not good enough. Accordingly, they have conducted a further study for improvement of the durability, and as a result, have found that the durability can be remarkably improved by fluorinating a polymer having alicyclic structures in its main chain and further having sulfonic acid groups, as compared with the durability improved by fluorinating the conventional polymer.

The present polymer is usually prepared by synthesizing a fluoropolymer having alicyclic structures in its main chain and further having —SO$_2$F groups, followed by hydrolysis and conversion to an acid form. With regard to contacting it with fluorine gas, the fluoropolymer having the —SO$_2$F group may be hydrolyzed and converted to an acid form in advance, followed by fluorination with fluorine gas, but such fluorination is preferably carried out in the step of a —SO$_2$F group (a precursor for a sulfonic acid group) before the hydrolysis and conversion to an acid form, as the process will be easy. The fluorine gas to be used for fluorination is usually one diluted with an inert gas such as nitrogen, helium or carbon dioxide to a concentration of at least 0.1% and less than 100%, but may be used without dilution. The polymer can be contacted with the fluorine gas in the state of bulking or as dispersed or dissolved in a fluorosolvent.

The polymer obtained by polymerization may be fluorinated as it is, but may be subjected to heat treatment before fluorination, so as to remove volatile components sufficiently or thermally stabilize the polymer. In such a case, the temperature is preferably from 200 to 300° C. in air or in an inert gas atmosphere such as nitrogen gas or under reduced pressure.

The temperature for the fluorination of the polymer by contact with the fluorine gas is usually from room temperature to 300° C., preferably from 25 to 250° C., particularly preferably from 100 to 220° C., more preferably from 150 to 200° C. If such a temperature is too low, the reaction of fluorine gas and polymer ends becomes slow, and if it is too high, —SO$_2$F groups tend to be detached. The contact time in the above temperature range is preferably from 1 minute to 1 week, particularly preferably from 1 to 50 hours.

In the fluorination process, when the polymer is fluorinated as dispersed or dissolved in a fluorosolvent, the following solvents may, for example, be used as the fluorosolvent.

A polyfluorotrialkylamine compound such as perfluorotributylamine or perfluorotripropylamine.

A fluoroalkane such as perfluorohexane, perfluorooctane, perfluorodecane, perfluorododecane, perfluoro(2,7-dimethyloctane), 2H,3H-perfluoropentane, 1H-perfluorohexane, 1H-perfluorooctane, 1H-perfluorodecane, 1H,4H-perfluorobutane, 1H,1H,1H,2H,2H-perfluorohexane, 1H,1H,1H,2H,2H-perfluorooctane, 1H,1H,1H,2H,2H-perfluorodecane, 3H,4H-perfluoro(2-methylpentane) or 2H,3H-perfluoro(2-methylpentane).

A chlorofluoroalkane such as 3,3-dichloro-1,1,1,2,2-pentafluoropropane, 1,3-dichloro-1,1,2,2,3-pentafluoropropane or 1,1-dichloro-1-fluoroethane.

A polyfluorocycloalkane such as perfluorodecalin, perfluorocyclohexane, perfluoro(1,2-dimethylcyclohexane), perfluoro(1,3-dimethylcyclohexane), perfluoro(1,3,5-trimethylcyclohexane) or perfluorodimethylcyclobutane (irrespective of the structural isomerism).

A hydrofluoroether such as n-C$_3$F$_7$OCH$_3$, n-C$_3$F$_7$OCH$_2$CF$_3$, n-C$_3$F$_7$OCHFCF$_3$, n-C$_3$F$_7$OC$_2$H$_5$, n-C$_4$F$_9$OCH$_3$, iso-C$_4$F$_9$OCH$_3$, n-C$_4$F$_9$OC$_2$H$_5$, iso-C$_4$F$_9$OC$_2$H$_5$, n-C$_4$F$_9$OCH$_2$CF$_3$, n-C$_5$F$_{11}$OCH$_3$, n-C$_6$F$_{13}$OCH$_3$, n-C$_5$F$_{11}$OC$_2$H$_5$, CF$_3$OCF(CF$_3$)CF$_2$OCH$_3$, CF$_3$OCHFCH$_2$OCH$_3$, CF$_3$OCHFCH$_2$OC$_2$H$_5$ or n-C$_3$F$_7$OCF$_2$CF(CF$_3$)OCHFCF$_3$, a fluorine-containing low molecular weight polyether, an oligomer of chlorotrifluoroethylene or the like.

These solvents may be used alone or in combination as a mixture of two or more of them.

In addition, many other compounds may be used. A chlorofluorocarbon solvent such as 1,1,2-trichloro-1,2,2-trifluoroethane, 1,1,1-trichloro-2,2,2-trifluoroethane, 1,1,1,3-tetrachloro-2,2,3,3-tetrafluoropropane or 1,1,3,4-tetrachloro-1,2,2,3,4,4-hexafluorobutane may be technically useful, but is not preferred from the viewpoint of the global environment protection. Further, it is also possible to carry out the reaction by means of liquid or supercritical carbon dioxide.

Among the above solvents, a solvent having hydrogen atoms will react with fluorine gas. Therefore, it is preferred to use a solvent having no hydrogen atoms.

The —$SO_2F$ groups in the polymer fluorinated as described above will be hydrolyzed in a solution of an alkali such as NaOH or KOH, or a mixed solvent of water and a polar solvent such as an alcohol such as methanol or ethanol, or dimethylsulfoxide, and then will be converted to an acid form by e.g. hydrochloric acid or sulfuric acid, i.e. to sulfonic acid groups. For example, when the polymer is hydrolyzed by an aqueous KOH solution, —$SO_2F$ groups will be converted to —$SO_3K$ groups, and then K ions will be substituted by protons. The hydrolysis and conversion to an acid form are carried out usually at a temperature of from 0° C. to 120° C.

The polymer having sulfonic acid groups or —$SO_2F$ groups as their precursors to be reacted with fluorine gas can be synthesized via a process of copolymerizing a monomer having cyclic structures or a cyclopolymerizable monomer with a monomer having sulfonic acid groups or precursors for the sulfonic acid groups. The above polymer is preferably a perfluoropolymer obtainable by copolymerizing only perfluoromonomers when the durability as an electrolyte material for fuel cells and easiness of the fluorination process are taken into consideration. Among the perfluoropolymers, if —COF groups, —COOH groups, —CF=$CF_2$ groups and the like are present at the terminals of the polymer main chain due to e.g. a chain transfer reaction and a polymerization initiator with hydrogen atoms is employed, non-perfluoro groups based on the polymerization initiator will be produced at the terminals of the polymer main chain. Therefore, the effect of fluorination will be obtained via the fluorination process.

When a perfluoro compound such as perfluorodiacyl peroxide represented by perfluorobutanoyl peroxide, is used as the above polymerization initiator, there may be a case where stable perfluoro groups will be introduced to the terminals, and the unstable terminal groups will decrease after the polymerization. If such a polymer having the unstable terminal groups decreased is further treated with fluorine gas, a polymer having very few unstable terminal groups can be more easily obtained, such being preferred.

The cyclic structures in the present polymer are not particularly limited, but are preferably cyclic structures represented by e.g. the following formulae, wherein n is an integer of from 1 to 4, $R^f$ is a $C_{1-8}$ perfluoroalkyl group or a perfluoroalkoxy group, and X and Y are each independently a fluorine atom or a trifluoromethyl group. Each cyclic structure is preferably one of 4- to 7-membered rings, and is preferably a 5-membered ring or a 6-membered ring in consideration of the stability of the ring;

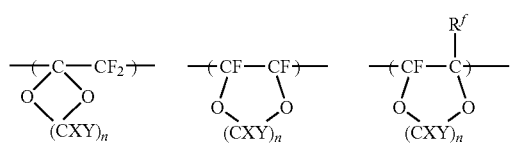

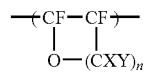
-continued

The monomer having a cyclic structure as a comonomer to obtain the present polymer may, for example, be perfluoro(2,2-dimethyl-1,3-dioxole) (hereinafter referred to PDD), perfluoro(1,3-dioxole), perfluoro(2-methylene-4-methyl-1,3-dioxolane) (hereinafter referred to MMD) or 2,2,4-trifluoro-5-trifluoromethoxy-1,3-dioxole.

The cyclopolymerizable monomer as a comonomer to obtain the present polymer may, for example, be perfluoro(3-butenylvinyl ether) (hereinafter referred to BVE), perfluoro[(1-methyl-3-butenyl)vinyl ether], perfluoro(allylvinyl ether) or 1,1'-[(difluoromethylene)bis(oxy)]bis[1,2,2,-trifluoroethene].

With respect to specific examples of repeating units based on the above-mentioned monomer having the above cyclic structure or a cyclopolymerizable monomer, a repeating unit based on PDD may be represented by the formula A, a repeating unit based on BVE may be represented by the formula B, and a repeating unit based on MMD may be represented by the formula C. In the present specification, "a fluoropolymer having alicyclic structures" represents a fluoropolymer comprising repeating units having such cyclic structures containing no unsaturated bonds.

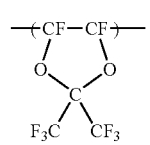
Formula A

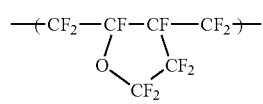
Formula B

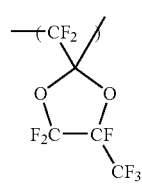
Formula C

A monomer having a sulfonic acid group or a precursor group for the sulfonic acid group to be reacted with a monomer having a cyclic structure or a cyclopolymerizable monomer is preferably a perfluorovinyl ether having a —$SO_2F$ group. Specifically, a perfluorovinyl ether represented by $CF_2$=CF—$(OCF_2CFY)_m$—$O_p$—$(CF_2)_n$—$SO_2F$ (wherein, Y is a fluorine atom or a trifluoromethyl group, m is an integer of from 0 to 3, n is an integer of from 1 to 12, p is 0 or 1 and m+p>0) is preferred. Among such perfluorovinyl ethers, compounds of the formulae 1 to 3 are preferred. Here, in the formulae 1 to 3, q is an integer of from 1 to 8, r is an integer of from 1 to 8, and s is 2 or 3. In the case of polymerization by using monomers having —$SO_2F$ groups, hydrolysis and acid form-conversion treatment to convert them to —$SO_3H$ groups are carried out to form an electrolyte material. Namely, the present polymer for the electrolyte material preferably contains repeating units based on $CF_2$=CF—$(OCF_2CFY)_m$—$O_p$—$(CF_2)_n$—$SO_3H$.

$CF_2=CFO(CF_2)_qSO_2F$          Formula 1

$CF_2=CFOCF_2CF(CF_3)O(CF_2)_rSO_2F$          Formula 2

$CF_2=CF(OCF_2CF(CF_3))_sO(CF_2)_2SO_2F$          Formula 3

Especially, the present polymer is preferably a polymer which contains repeating units based on a monomer selected from the group consisting of perfluoro(3-butenyl vinyl ether), perfluoro(2,2-dimethyl-1,3-dioxole), perfluoro(1,3-dioxole), 2,2,4-trifluoro-5-trifluoromethoxy-1,3-dioxole and perfluoro(2-methylene-4-methyl-1,3-dioxolane), and repeating units based on perfluoro(3,6-dioxa-4-methyl-7-octene)sulfonic acid ($CF_2=CFOCF_2CF(CF_3)O(CF_2)_2SO_3H$) or perfluoro(3-oxa-4-pentene)sulfonic acid ($CF_2=CFO(CF_2)_2SO_3H$).

The present polymer is prepared via a step of copolymerizing the above-mentioned cyclic monomer or the cyclopolymerizable monomer with a monomer having a sulfonic acid group or a precursor group for the sulfonic acid group represented by e.g. formulae 1 to 3, but other monomers such as tetrafluoroethylene may further be copolymerized, e.g. to adjust the strength. Because if the present polymer is constituted solely by repeating units based on the monomer having a cyclic structure and the repeating units based on the monomer having a sulfonic acid group, its skeleton tends to be stiff, and in a case where such a polymer is used for a membrane or a catalyst layer for fuel cells, the membrane or the catalyst layer tends to be brittle.

Here, the present polymer is excellent in water repellency by the fluorination process after polymerization, and improves the output power of a fuel cell and shows stable properties for a long term, when used as an electrolyte for a cathode of the fuel cell. However, in the case of copolymerizing other monomers, the content of the repeating units based on such other monomers in the present polymer is preferably at most 35%, particularly preferably at most 20%, by mass ratio, so as not to impair such excellent output power characteristics.

The above-mentioned copolymerizable monomer may, for example, be tetrafluoroethylene, chlorotrifluoroethylene, vinylidene fluoride, hexafluoropropylene, trifluoroethylene, vinyl fluoride or ethylene. Further, a compound represented by $CF_2=CFOR^{f1}$, $CH_2=CHR^{f2}$, $CH_2=CHCH_2R^{f2}$ or $CF_2=CFOR^{f3}Z$ may also be used. Here, $R^{f1}$ represents a $C_{1-12}$ perfluoroalkyl group which may be branched and may contain an oxygen atom of an ether bond type. $R^{f2}$ represents a $C_{1-12}$ perfluoroalkyl group. $R^{f3}$ represents a $C_{2-6}$ perfluoroalkylene group which may be branched and may contain an oxygen atom of an ether bond type. Z is —CN, —COOR (wherein R is a $C_{1-6}$ alkyl group) or —COF.

Among the above monomers, a perfluoromonomer is preferably used from the viewpoint of easiness of the reaction with fluorine gas and durability. Tetrafluoroethylene is particularly preferred, since it is readily available and has a high polymerization reactivity.

The compound represented by $CF_2=CFOR^{f1}$ among the above monomers is preferably a perfluorovinyl ether compound represented by $CF_2=CF-(OCF_2CFX)_t-O-R^{f4}$. Here, in the formula, t is an integer of from 0 to 3, X is a fluorine atom or a trifluoromethyl group, and $R^{f4}$ is a linear or branched $C_{1-12}$ perfluoroalkyl group (hereinafter, $R^{f4}$ means the same in the present specification). The compounds represented by the formulae 4 to 6 are particularly preferred. Here, in the formulae, v is an integer of from 1 to 8, w is an integer of from 1 to 8, and x is 2 or 3.

$CF_2=CFO(CF_2)_vCF_3$          Formula 4

$CF_2=CFOCF_2CF(CF_3)O(CF_2)_wCF_3$          Formula 5

$CF_2=CF(OCF_2CF(CF_3))_xO(CF_2)_2CF_3$          Formula 6

In order to increase the strength of the membrane or the catalyst layer using the present polymer, the number average molecular weight of the present polymer is preferably at least 5,000, more preferably at least 10,000, further preferably at least 20,000. However, if the molecular weight is too high, the moldability or the solubility in the after-mentioned solvent will decrease, and therefore, the molecular weight is preferably at most 5,000,000, more preferably at most 2,000,000.

In the present polymer, the content of the repeating units based on the monomer having a cyclic structure is preferably from 0.5 to 80 mol %, more preferably from 1 to 80 mol %, further preferably from 4 to 70 mol %, and still further preferably from 10 to 70 mol %.

Even if the content of the repeating units based on the monomer having a cyclic structure is small, the durability improves. However if it is less than 0.5%, the durability may tend to hardly improve. Further, if the content of the repeating units having cyclic structures is too large, the sulfonic acid groups in the polymer will decrease, and the electroconductivity will decrease because the ion exchange capacity tends to be small.

Further, the repeating units having sulfonic acid groups are preferably contained in such an amount that the ion exchange capacity of the present polymer will be from 0.5 to 2 meq/g dry resin, and are more preferably contained in such an amount that it will be from 0.7 to 1.5 meq/g dry resin. If such an ion exchange capacity is too low, the electroconductivity of the polymer as an electrolyte material will decrease, and if it is too high, the water repellency will deteriorate, and the durability will deteriorate when used for fuel cells, and the polymer strength will be insufficient.

For the polymerization to obtain the present polymer, conventional known methods such as bulk polymerization, solution polymerization, suspension polymerization or emulsion polymerization may be carried out. The polymerization is carried out under a condition where radicals will be generated, and a method of irradiating a radiation such as ultraviolet rays, γ-rays or electron rays and a method of adding a radical initiator to be used in usual radical polymerization, may be employed. The polymerization temperature is usually from about 20 to 150° C. The radical initiator may, for example, be a bis(fluoroacyl)peroxide, a bis(chlorofluoroacyl)peroxide, a dialkylperoxydicarbonate, a diacyl peroxide, a peroxyester, an azo compound or a persulfate.

In solution polymerization, a solvent to be used usually has a boiling point of from 20 to 350° C., preferably from 40 to 150° C. from the viewpoint of handling efficiency. A useful solvent may be the same solvent as the fluorosolvent exemplified as a suitable fluorosolvent when the present polymer is fluorinated in the fluorosolvent. Namely, a polyfluorotrialkylamine compound, a perfluoroalkane, a hydrofluoroalkane, a chlorofluoroalkane, a fluoroolefin having no double bond at the terminal of the molecular chain, a polyfluorocycloalkane, a polyfluorocyclic ether compound, a hydrofluoroether, a fluorine-containing low molecular weight polyether or t-butanol may, for example, be mentioned. These solvents may be used alone or in combination as a mixture of two or more of them. Further, it is also possible to carry out the polymerization by using liquid or supercritical carbon dioxide.

The present polymer can be dissolved or dispersed suitably in a —OH group-containing organic solvent. Such a solvent is preferably an alcoholic —OH group-containing organic solvent. Specifically, methanol, ethanol, 1-propanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol or 3,3,4,4,5,5,6,6,7,7,8,8-tridecafluoro-1-octanol may, for example, be mentioned. Further, as an organic solvent other than an alcohol, an organic solvent having a carboxyl group such as acetic acid, may also be used, but is not restricted thereto.

The —OH group-containing organic solvents may be used as a mixture of a plurality of such solvents, or may be used as mixed with water or with other fluorosolvents. As such other fluorosolvents, the same solvents may be exemplified as the fluorosolvents exemplified as preferred fluorosolvents when the present polymer is fluorinated in the fluorosolvent. When a mixed solvent is used, the content of the —OH group-containing organic solvent is preferably at least 10%, particularly preferably at least 20%, based on the total mass of the solvents.

In such a case, the present polymer may be dissolved or dispersed in the mixed solvent from the beginning. Otherwise, firstly, the present polymer may be dissolved or dispersed in the —OH group-containing organic solvent, and then, other solvents may be mixed thereto.

The dissolution or the dispersion is preferably carried out within a temperature range of from 0 to 250° C., particularly preferably within a range of from 20 to 150° C. under atmospheric pressure or under such a condition as closed and pressurized by e.g. an autoclave.

Further, the present polymer may be dissolved or dispersed in an alcoholic solvent having a boiling point lower than that of water, and then water may be added and the alcohol may be distilled off to prepare an aqueous dispersion containing substantially no organic solvent.

If a liquid composition obtainable by dissolving or dispersing the present polymer as described above, is used to prepare a cathode of the polymer electrolyte fuel cell, it is possible to obtain a cathode which is excellent in gas diffusibility and water repellency. The concentration of the present polymer in the liquid composition is preferably from 1 to 50%, particularly preferably from 3 to 30%, based on the total mass of the liquid composition. If the concentration is too low, for example, a large amount of the organic solvent is required at the time of preparing the cathode. If the concentration is too high, the viscosity of the liquid tends to be high, whereby handling tends to be difficult.

In the present invention, for example, an electroconductive carbon black powder having platinum catalyst particles supported thereon is mixed and dispersed to the liquid composition containing the present polymer, and the resulting uniform dispersion is used to obtain a membrane-electrode assembly for polymer electrolyte fuel cells by either one of the following two methods. A first method comprises applying the above dispersion on both sides of a cation exchange membrane as a membrane-form polymer electrolyte and drying the dispersion, and then bonding carbon cloth or carbon paper thereto. A second method comprises applying the above dispersion on carbon cloth or carbon paper and drying the dispersion, followed by bonding onto a cation exchange membrane.

In the polymer electrolyte fuel cell of the present invention, the mass ratio of the catalyst to the ion exchange resin as an electrolyte material contained in the cathode, is preferably such that catalyst:ion exchange resin=40:60 to 95:5 from the viewpoint of electroconductivity of the electrode and water discharging property. The mass of the catalyst here includes the mass of a carrier in a case of a supported catalyst in which the catalyst is supported on a carrier such as carbon.

Further, the ion exchange resin in the cathode may be a resin made of the present polymer alone, or may be a mixture of a conventional known perfluoropolymer having sulfonic acid groups and the present polymer. The conventional known polymer may, for example, be a copolymer of tetrafluoroethylene and a perfluorovinyl ether represented by $CF_2=CF—(OCF_2CFY)_m—O_p—(CF_2)_n—SO_3H$ (wherein Y is a fluorine atom or a trifluoromethyl group, m is an integer of from 0 to 3, n is an integer of from 1 to 12, p is 0 or 1, and m+p>0). Particularly preferred is a polymer having sulfonic acid groups, obtained by hydrolysis and a conversion into an acid form of a copolymer of tetrafluoroethylene and a monomer represented by any one of the above formulae 1 to 3.

In the case of a cathode wherein the conventional known polymer is used as mixed with the present polymer, the ratio of the present polymer is preferably at least 20%, particularly preferably at least 50%, based on the total mass of the ion exchange resins in the cathode.

The anode in the present invention may be the same as the cathode, or may be made of e.g. a gas diffusion electrode which is used heretofore. The anode may be formed by the same process as the cathode, whereby a membrane-electrode assembly having an anode disposed on one side of the membrane and a cathode disposed on another side can be obtained. The present polymer is an electrolyte material for polymer electrolyte fuel cells, and such a polymer may be contained in the anode instead of in the cathode, or may be used as a material for an ion exchange membrane as a membrane-form polymer electrolyte.

The resulting membrane-electrode assembly may, for example, be interposed between separators made of e.g. an electroconductive carbon plate having grooves formed as channels for a fuel gas or an oxidant gas (air, oxygen and the like) containing oxygen, and then assembled in a cell to obtain the polymer electrolyte fuel cell of the present invention. The polymer electrolyte fuel cell using the electrolyte material of the present invention is not restricted to a hydrogen-oxygen fuel cell, and is applicable to a direct methanol fuel cell (DMFC) or the like. Also in such a case, the present polymer is preferably contained in the cathode.

Now, the present invention will be described in detail with reference to Examples. However, it should be understood that the present invention is by no means restricted thereto.

In the following Examples, the following abbreviations are used.

PSVE: $CF_2=CFOCF_2CF(CF_3)OCF_2CF_2SO_2F$,
PSVE2: $CF_2=CFOCF_2CF_2OCF_2CF_2SO_2F$,
IPP: $(CH_3)_2CHOC(=O)OOC(=O)OCH(CH_3)_2$,
PFB: $CF_3CF_2CF_2C(=O)OOC(=O)CF_2CF_2CF_3$,
HCFC 141b: $CH_3CCl_2F$ (manufactured by Asahi Glass Company, Limited),
HCFC 225cb: $CClF_2CF_2CHClF$ (manufactured by Asahi Glass Company, Limited)

Example 1

Preparation of PDD/PSVE Copolymer

Into an autoclave having a capacity of 200 ml, 26.0 g of PDD, 127.8 g of PSVE and 0.46 g of IPP were put, and after deaeration, nitrogen was introduced so that the pressure would be 0.3 MPa. Then, the temperature was raised to 40° C., and polymerization was initiated with stirring. After 10 hours, the interior of the autoclave was cooled, and purge was carried out to stop the polymerization. After diluting with HCFC 225cb, the resulting mixture was poured into hexane to precipitate the polymer, which was washed twice with hexane and further washed once with HCFC 141b. After filtration, vacuum drying was carried out at 80° C. for 16 hours to obtain 41.6 g of a white polymer. The content of sulfur was determined by an elemental analysis, and the ratio of PDD/PSVE and the ion exchange capacity were determined and formed to be 56.5/43.5 (molar ratio), and 1.31 meq/g dry resin, respectively. Further, the molecular weight was measured by GPC, whereby the number average molecular weight as calculated as polymethyl methacrylate was 33,000.

Into a Hastelloy autoclave of 2,000 ml, 10 g of the above polymer was put, and after deaeration, fluorine gas (20 vol %) diluted with nitrogen gas was introduced so that the gauge pressure would be 0.3 MPa. The reaction system was maintained at 180° C. for 4 hours. Then, the resulting polymer was hydrolyzed with an alkali, converted to an acid form and dried, and then dissolved in ethanol to obtain a transparent 10% solution. A cast film having a thickness of 200 μm was prepared from this solution, and heated at 160° C. for 30 minutes. Then, the resulting cast film was set in TMA (manufactured by Mac Science Company). The cast film was heated at a rate of 5° C./min under a load of 3.5 g exerted by a quartz probe having a diameter of 1 mm. The temperature, at which the thickness of the film started to abruptly decrease due to penetration of the probe into the cast film, was measured as the softening temperature. As a result, the softening temperature of this polymer was 150° C.

Example 2

Preparation of BVE/PSVE Copolymer

In a nitrogen atmosphere, 120.0 g of BVE, 128.5 g of PSVE and 0.76 g of IPP were put into a flask of 300 ml, and the temperature in the flask was raised to 40° C. to initiate polymerization with stirring. After 16.7 hours, the polymerization was stopped, and the product was put into hexane to precipitate the polymer, which was further washed three times with hexane. After filtration, vacuum drying was carried out at 80° C. for 16 hours to obtain 47.8 g of a white polymer.

The content of sulfur was obtained by an elemental analysis, and the ratio of BVE/PSVE and the ion exchange capacity were obtained, whereby they were respectively BVE/PSVE=67.0/33.0 (molar ratio) and 0.99 meq/g dry resin. Further, the molecular weight was measured by GPC, whereby the number average molecular weight as calculated as polymethyl methacrylate was 29,000. Into a Hastelloy autoclave of 2,000 ml, 10 g of the above polymer was put, and after deaeration, fluorine gas (20 vol %) diluted with nitrogen gas was introduced so that the gauge pressure would be 0.3 MPa. The reaction system was maintained at 180° C. for 4 hours. Then, the resulting polymer was hydrolyzed with an alkali, converted to an acid form and dried, and then dissolved in ethanol to obtain a transparent 10% solution. The softening temperature of this polymer measured in the same manner as in Example 1 was 110° C.

Example 3

Preparation of TFE/PDD/PSVE Copolymer

Into an autoclave having a capacity of 200 ml, 14.30 g of PDD, 52.64 g of PSVE, 76.94 g of HCFC 225cb and 0.36 g of IPP were put, followed by freeze-deaeration. After introducing 5.9 g of TFE, the temperature was raised to 40° C. to initiate polymerization. The pressure at that time was 0.26 MPa (gauge pressure). The reaction was carried out at 40° C. for 10 hours, and when the pressure became 0.07 MPa (gauge pressure), the reaction was terminated. The polymerization solution was diluted with HCFC 225cb and subjected to flocculation with hexane, followed by washing three times with hexane. Vacuum drying was carried out at 80° C. overnight to obtain 25.03 g of a polymer (yield: 34.4%).

The composition of the polymer was determined by $^{19}$F-NMR, whereby TFE/PDD/PSVE=42/35/22 (molar ratio), and the ion exchange capacity was 0.98 meq/g dry resin. Further, the number average molecular weight as calculated as polymethyl methacrylate, by GPC, was 53,000 and the weight average molecular weight was 83,000. 10 g of this polymer was put into a Hastelloy autoclave of 2,000 ml, followed by deaeration. Fluorine gas (20 vol %) diluted with nitrogen gas was introduced so that the gauge pressure would be 0.3 MPa, and the system maintained at 180° C. for 4 hours. Then, the resulting polymer was hydrolyzed with an alkali, converted to an acid form and dried, and then dissolved in ethanol to obtain a transparent 12% solution.

Further, by using the polymer obtained by the treatment with fluorine gas, hot pressing was applied to prepare a film having a thickness of 100 μm. This film was immersed in a solution of KOH/H$_2$O/DMSO=11/59/30 (mass ratio) and maintained at 90° C. for 17 hours for hydrolysis. Then, after cooling to room temperature, the film was washed three times with water. Further, it was immersed in 2N sulfuric acid at room temperature for 2 hours and then washed with water. This immersion in sulfuric acid and washing with water were carried out in a total of three times each, and finally washing with water was carried out three times. Air-drying at 80° C. for 16 hours was carried out, and further, vacuum drying at 80° C. was carried out to obtain an acid-form converted dry film. The dynamic viscoelasticity was measured, and the temperature at which the modulus abruptly decreased was obtained as a softening temperature. As a result, the softening temperature of this polymer was 120° C.

Example 4

Preparation of TFE/PDD/PSVE Copolymer 2

Using 9 g of TFE, 24.4 g of PDD, 102.6 g of PSVE and 0.08 g of IPP, polymerization was carried out in the same manner as in Example 3 except that HCFC 225cb was not used. Polymerization was carried out at 40° C. for 12 hours to complete the reaction. The resulting polymerization solution was diluted with HCFC 225cb and subjected to flocculation with hexane, followed by washing three times with hexane. Vacuum drying was carried out at 80° C. overnight to obtain 37.8 g of a polymer (yield: 27.7%).

The molecular weight and composition were measured in the same manner as in Example 3. The composition of the resulting polymer was TFE/PDD/PSVE=36/41/23, and the ion exchange capacity was 0.97 meq/g dry resin. Further, the number average molecular weight was 160,000, and the weight average molecular weight was 280,000. The resulting polymer was subjected to heat treatment under reduced pressure at 240° C. for 4 hours and then treated with fluorine gas in the same manner as in Example 3.

Example 5

Preparation of TFE/PDD/PSVE2 Copolymer

Using 6 g of TFE, 16.5 g of PDD, 68.3 g of PSVE2 and 0.05 g of IPP, polymerization was carried out in the same manner as in Example 4. Polymerization was carried out at 40° C. for 20 hours. The resulting polymerization solution was diluted with HCFC 225cb and subjected to flocculation with hexane, followed by washing three times with hexane. Vacuum drying was carried out at 80° C. overnight to obtain 27.3 g a polymer (yield: 30.1%).

The molecular weight and composition were measured and fluorine gas treatment was carried out in the same manner as in Example 3. The composition of the resulting polymer was TFE/PDD/PSVE2=36/39/26, and the ion exchange capacity was 1.11 meq/g dry resin. Further, the number average molecular weight was 167,000, and the weight average molecular weight was 870,000.

Example 6

Preparation of TFE/MMD/PSVE Copolymer

Into an autoclave having a capacity of 200 ml, 14.1 g of MMD, 78.0 g of PSVE and 0.3 g of HCFC 225cb solution containing 3 mass % PFB were put, followed by freeze-deaeration. After introducing 14.1 g of TFE, polymerization was carried out at 20° C. for 22 hours. The polymerization solution was diluted with HCFC 225cb and subjected to flocculation with hexane, followed by washing three times with hexane. Vacuum drying was carried out at 80° C. overnight to obtain 2.2 g of a polymer.

With regard to the resulting polymer, the molecular weight and compositions were measured and fluorine gas treatment was carried out in the same manner as in Example 3. The composition of the resulting polymer was TFE/MMD/PSVE=30/47/23 (molar ratio), and the ion exchange capacity was 0.93 meq/g dry resin. Further, the number average molecular weight as calculated as polymethyl methacrylate measured, by GPC was 155,000, and the weight average molecular weight was 239,000.

Example 7

Preparation of TFE/MMD/PSVE Copolymer 2

Into an autoclave having a capacity of 200 ml, 0.7 g of MMD, 92.6 g of PSVE, 50.8 g of HCFC 225cb and 2.57 g of HCFC 225cb solution containing a 3 mass % PFB were put, followed by freeze-deaeration. The temperature was raised to 40° C., and TFE was introduced so that the gauge pressure would be 0.5 MPa. Then, TFE was introduced while this pressure was maintained, and polymerization was carried out at 40° C. for 7 hours. The polymerization solution was subjected to flocculation with HCFC 141b, followed by washing three times with HCFC 141b. Vacuum drying was carried out at 80° C. overnight to obtain 19.9 g of a polymer.

The resulting polymer was hydrolyzed in a KOH aqueous solution, and titrated with an aqueous hydrochloric acid, whereby the ion exchange capacity was 1.06 meq/g dry resin. Further, the composition of the polymer was determined by $^{19}$F-NMR, whereby TFE/MMD/PSVE=77/5/18 (molar ratio). This polymer was treated with fluorine gas in the same manner as in Example 3.

Example 8

Preparation of TFE/MMD/PSVE Copolymer 3

Into an autoclave having a capacity of 200 ml, 0.4 g of MMD, 93.0 g of PSVE, 53.3 g of HCFC 225cb and 2.62 g of a HCFC 225cb solution containing a 3 mass % PFB were put, followed by freeze-deaeration. The temperature was raised to 40° C., and TFE was introduced so that the gauge pressure would be 0.45 MPa. Then, TFE was introduced while this pressure was maintained, and polymerization was carried out at 40° C. for 7 hours. The polymerization solution was subjected to flocculation with HCFC 141b, followed by washing three times with HCFC 141b. Vacuum drying was carried out at 80° C. overnight to obtain 16.7 g of a polymer.

The resulting polymer was hydrolyzed in a KOH aqueous solution, and titrated with an aqueous hydrochloric acid, whereby the ion exchange capacity was 1.04 meq/g dry resin. Further, the composition of the polymer was determined by $^{19}$F-NMR, whereby TFE/MMD/PSVE=74/8/18 (molar ratio). This polymer was treated with fluorine gas in the same manner as in Example 3.

Example 9

TFE/MMD/PSVE 4

Into an autoclave having a capacity of 200 ml, 2.4 g of MMD, 91.8 g of PSVE, 55.2 g of HCFC 225cb and 2.66 g of a HCFC 225cb solution containing a 3 mass % PFB were put, followed by freeze-deaeration. The temperature was raised to 40° C., and TFE was introduced so that the gauge pressure would be 0.40 MPa. Then, TFE was introduced while this pressure was maintained, and polymerization was carried out. The polymerization was carried out at 40° C. for 7 hours. The polymerization solution was subjected to flocculation with HCFC 141b, followed by washing three times with HCFC 141b. Vacuum drying was carried out at 80° C. overnight to obtain 14.9 g of a polymer.

The resulting polymer was hydrolyzed in a KOH aqueous solution, and titrated with an aqueous hydrochloric acid, whereby the ion exchange capacity was 1.13 meq/g dry resin. Further, the composition of the polymer was determined by $^{19}$F-NMR, whereby TFE/MMD/PSVE=61/16/23 (molar ratio). This polymer was treated with fluorine gas in the same manner as in Example 3.

Example 10

Preparation of TFE/BVE/PSVE Copolymer

Into an autoclave having a capacity of 200 ml, 48.6 g of BVE, 86.4 g of PSVE, 86.2 g of 1,1,2-trichlorotrifluoroethane and 0.75 g of a HCFC 225cb solution containing a 3 mass % PFB were put, followed by freeze-deaeration. The temperature was raised to 30° C., and TFE was introduced so that the pressure would be 0.15 MPa. Then, TFE was introduced while this pressure was maintained, and polymerization was carried out. The polymerization was carried out at 30° C. for 16 hours. The polymerization solution was subjected to flocculation with hexane, followed by washing three times with hexane. Vacuum drying was carried out at 80° C. overnight to obtain 8.3 g of a polymer:

The resulting polymer was hydrolyzed in a KOH aqueous solution, and titrated with an aqueous hydrochloric acid, whereby the ion exchange capacity was 0.95 meq/g dry resin. Further, the composition of the polymer was measured by $^{19}$F-NMR, whereby TFE/BVE/PSVE=61/20/19 (molar ratio). This polymer was treated with fluorine gas in the same manner as in Example 3.

Comparative Example 1

The polymer of Example 4 was recovered without treatment with fluorine gas. The composition and the molecular weight were the same.

Comparative Example 2

10 g of a powder of a copolymer comprising TFE and PSVE (ion exchange capacity measured when converted into an acid form: 1.1 meq/g dry resin, hereinafter referred to as copolymer A) was subjected to heat treatment in a reduced pressure oven under a pressure of 10 Pa, and at a temperature of 250° C. for 4 hours. Then, the treatment with fluorine gas was carried out in the same manner as in Example 3.

Preparation of Fuel Cell and Evaluation Test for Durability of Electrolyte Material A fuel cell was assembled as follows. A copolymer comprising repeating units based on $CF_2=CF_2$ and repeating units based on $CF_2=CF-OCF_2CF(CF_3)O(CF_2)_2SO_3H$ (ion exchange capacity 1.1 meq/g dry resin) and a platinum-loaded carbon were mixed in a mass ratio of 1:3, and the mixture was mixed with ethanol to prepare a coating solution. This coating solution was applied on an ethylene-tetrafluoroethylene film substrate by die coating and dried to form a 10 μm thick electrode layer having a platinum content of 0.5 mg/cm$^2$.

Then, each of the polymers obtained in Examples 4 to 10 and Comparative Examples 1 and 2 was subjected to hot pressing to prepare a film having a thickness of 50 μm. Each film was immersed in a solution of $KOH/H_2O/DMSO=15/55/30$ (mass ratio) and maintained at 80° C. for 17 hours for hydrolysis. Then, after cooling to room temperature, it was washed three times with water. Further, it was immersed in a 3 mol/L hydrochloric acid at room temperature for 2 hours and then washed with water. This immersion in hydrochloric acid and washing with water were carried out in a total of three times each, and finally washing with water was carried out for three times. Air-drying at 60° C. for 16 hours was carried out to obtain an electrolyte membrane. Further, also with respect to the copolymer A in Comparative Example 2 (without fluorination treatment), an electrolyte membrane was obtained in the same manner.

Then, a pair of electrode layers obtained as mentioned above were disposed so that the respective electrode layers were faced each other and the electrolyte membrane was interposed therebetween, and pressing was carried out to prepare one having the electrode layers transferred onto the membrane in each Example. Further, carbon cloths were put as gas diffusion layers on both sides to obtain a membrane-electrode assembly.

Further, carbon plates having narrow zigzag grooves as gas channels cut by machining were put on both sides as separators, and then heaters were disposed on the outer surfaces to assemble a polymer electrolyte fuel cell having an effective membrane surface area of 25 cm$^2$.

The durability was evaluated by the following method. The temperature of the fuel cell was maintained at 90° C. in a state where the circuit was opened, steam-containing air was supplied to the cathode at a dew point of 50° C., and steam-containing hydrogen was supplied to the anode at a dew point of 50° C. at a rate of 50 ml/min, respectively. After the operation was continued for the time shown in Table in such a state, the fuel cell was disassembled, and the deterioration state of the electrolyte membrane was measured by mass measurement. The result is shown in Table. Here, the mass decreasing rate is calculated by dividing the mass decrease (%) by the operation time (hr).

TABLE

| | Operation time (hr) | Mass decrease (%) | Mass decreasing rate |
|---|---|---|---|
| Example 4 | 472 | 3 | 0.01 |
| Example 5 | 125 | 3 | 0.02 |
| Example 6 | 115 | 2 | 0.02 |
| Example 7 | 117 | 1 | 0.01 |
| Example 8 | 95 | 3 | 0.03 |
| Example 9 | 139 | 1 | 0.01 |
| Example 10 | 116 | 3 | 0.03 |
| Comparative Example 1 | 138 | 11 | 0.08 |
| Comparative Example 2 | 95 | 6 | 0.06 |
| Copolymer A | 95 | 20 | 0.21 |

INDUSTRIAL APPLICABILITY

The electrolyte material of the present invention is a sulfonic acid polymer having a softening temperature higher than the softening temperature of 80° C. of a tetrafluoroethylene/$CF_2=CFCF_2CF(CF_3)O(CF_2)_2SO_3H$ copolymer, used heretofore, as shown in Examples. The softening temperature is particularly high, especially when it is a polymer copolymerized by using a monomer having a cyclic structure or a cyclopolymerizable monomer, of which the softening temperature of a homopolymer is at least 100° C.

The modulus of the above conventional polymer starts to decrease abruptly from near 80° C., and the softening temperature is close to the operation temperature of a fuel cell, and therefore, the properties such as swelling are likely to change with time, and there is a problem in durability if such a polymer is used as an electrolyte for a fuel cell. Further, it is difficult to operate the fuel cell at a temperature of at least 80° C. Whereas, the electrolyte material of the present invention has a high softening temperature, and therefore, the properties do not change with time and high durability can be achieved if it is used as a polymer for an electrolyte contained in an electrolyte membrane or electrodes for a fuel cell. Further, it is also possible to operate the cell at a temperature higher than 80° C.

Further, the electrolyte material for polymer electrolyte fuel cells of the present invention, has alicyclic structures in its main chain, and thus has excellent gas diffusibility, and it is highly fluorinated and thus has excellent water repellency and excellent durability even in a long-term operation of the electrolyte fuel cell.

The entire disclosure of Japanese Patent Application No. 2003-011097 filed on Jan. 20, 2003 including specification, claims and summary is incorporated herein by reference in its entirety.

What is claimed is:

1. A process for producing a membrane-electrode assembly for polymer electrolyte fuel cells which comprises a membrane-form polymer electrolyte, a cathode disposed on one side of the electrolyte and comprising a catalyst and a perfluoropolymer having alicyclic structures in its main chain and further having sulfonic acid groups, and an anode disposed on the other side of the electrolyte, wherein the perfluoropolymer having sulfonic acid groups is produced via a step of obtaining a perfluoropolymer having alicyclic structures in its main chain and further having —SO$_2$F groups by radical polymerization and then contacting the perfluoropolymer with fluorine gas, and a step of converting the —SO$_2$F groups to the sulfonic acid groups.

2. The process for producing a membrane-electrode assembly for polymer electrolyte fuel cells according to claim 1, wherein the perfluoropolymer having sulfonic acid groups is made of a copolymer comprising repeating units based on the following monomer A and repeating units based on the following monomer B (wherein Y is a fluorine atom or a trifluoromethyl group, m is an integer of from 0 to 3, p is 0 or 1, and n is an integer of from 1 to 12):

Monomer A: A perfluoromonomer which gives a polymer having repeating units containing cyclic structures in its main chain by radical polymerization Monomer B: $CF_2=CF-(OCF_2CFY)_m-O_p-(CF_2)_n-SO_3H$.

3. The process for producing a membrane-electrode assembly for polymer electrolyte fuel cells according to claim 2, wherein the monomer A is selected from the group consisting of perfluoro(3-butenyl vinyl ether), perfluoro(2,2-dimethyl-1,3-dioxole), perfluoro(1,3-dioxole), 2,2,4-trifluoro-5-trifluoromethoxy-1,3-dioxole and perfluoro(2-methylene-4-methyl-1,3-dioxolane), and the monomer B is perfluoro(3,6-dioxa-4-methyl-7-octene)sulfonic acid or perfluoro(3-oxa-4-pentene)sulfonic acid.

4. The process for producing a membrane-electrode assembly for polymer electrolyte fuel cells according to claim 1, wherein said contacting the perfluoropolymer with fluorine gas is carried out at a temperature of from 150 to 200° C.

5. The process for producing a membrane-electrode assembly for polymer electrolyte fuel cells according to claim 1, wherein said contacting the perfluoropolymer with fluorine gas is carried out over a period of time of from 1 to 50 hours.

6. The process for producing a membrane-electrode assembly for polymer electrolyte fuel cells according to claim 1, wherein said contacting the perfluoropolymer with fluorine gas is carried out over a period of time of from 1 to 50 hours at a temperature of from 150 to 200° C.

7. The process for producing a membrane-electrode assembly for polymer electrolyte fuel cells according to claim 1, wherein the perfluoropolymer is subjected to heat treatment prior to contacting the perfluoropolymer with fluorine gas.

8. The process for producing a membrane-electrode assembly for polymer electrolyte fuel cells according to claim 1, wherein the perfluoropolymer is dispersed or dissolved in a fluorosolvent having no hydrogen atoms prior to contacting the perfluoropolymer with fluorine gas.

* * * * *